US010166539B2

(12) United States Patent
Chung et al.

(10) Patent No.: US 10,166,539 B2
(45) Date of Patent: Jan. 1, 2019

(54) MULTIPLEXER FOR CONTROLLING FLUID IN MICROFLUIDICS CHIP AND MICROFLUIDICS CHIP ASSEMBLY

(71) Applicant: SOGANG UNIVERSITY RESEARCH FOUNDATION, Seoul (KR)

(72) Inventors: Bong Geun Chung, Gwacheon-si (KR); Tae Hyeon Kim, Seoul (KR); Jong Min Lee, Seoul (KR)

(73) Assignee: SOGANG UNIVERSITY RESEARCH FOUNDATION (KR)

( * ) Notice: Subject to any disclaimer, the term of this patent is extended or adjusted under 35 U.S.C. 154(b) by 177 days.

(21) Appl. No.: 15/365,876

(22) Filed: Nov. 30, 2016

(65) Prior Publication Data

US 2017/0297021 A1 Oct. 19, 2017

(30) Foreign Application Priority Data

Apr. 14, 2016 (KR) ........................ 10-2016-0045560

(51) Int. Cl.
*B01L 3/00* (2006.01)
*F04B 19/00* (2006.01)
(Continued)

(52) U.S. Cl.
CPC . *B01L 3/502715* (2013.01); *B01L 2300/0816* (2013.01); *B01L 2300/0861* (2013.01);
(Continued)

(58) Field of Classification Search
CPC ....... B01L 2200/027; B01L 2200/0652; B01L 2200/0668; B01L 2300/044; B01L 2300/0636; B01L 2300/0645; B01L 2300/0816; B01L 2300/0819; B01L 2300/0829; B01L 2300/0851; B01L 2300/0864; B01L 2300/087; B01L 2300/0877; B01L 2400/0424; B01L 2400/0433; B01L 2400/0454;
(Continued)

(56) References Cited

U.S. PATENT DOCUMENTS 5,259,105 A * 11/1993 Zimmerman, Jr. .......................... B29C 45/4005 249/68

FOREIGN PATENT DOCUMENTS

KR 1020120056055 6/2012

OTHER PUBLICATIONS

Kim, TaeHyeon, LED Sensor and Microfluidic Multiplexor for Chemical and Biomedical Applications, Graduate School of Sogang University Department of Mechanical Engineering Thesis, Dec. 2014, pp. 1-44.

* cited by examiner

*Primary Examiner* — Jennifer Wecker
(74) *Attorney, Agent, or Firm* — Kunzler, PC

(57) ABSTRACT

A multiplexer for controlling a fluid in a microchannel by controlling pneumatic pressure in the microchannel in a microfluidics chip includes: a first pneumatic channel; and a second pneumatic channel forming a cross point which is in communication with the first pneumatic channel, wherein the cross point is in communication with the microchannel of the microfluidics chip, and predetermined pneumatic pressure is provided to the microchannel by using a combination of providing of the pneumatic pressure to the first and second pneumatic channels, channel closing, or channel opening.

10 Claims, 4 Drawing Sheets

(51) Int. Cl.
*G01N 3/12* (2006.01)
*B29C 45/40* (2006.01)

(52) U.S. Cl.
CPC .................. *B01L 2300/0864* (2013.01); *B01L 2300/0867* (2013.01); *B01L 2300/0874* (2013.01); *B01L 2300/0887* (2013.01); *B01L 2300/14* (2013.01); *B01L 2400/0475* (2013.01); *B01L 2400/0487* (2013.01); *B01L 2400/0666* (2013.01)

(58) Field of Classification Search
CPC ......... B01L 2400/086; B01L 3/502761; B03C 2201/26; B03C 5/005; B03C 5/026; B03C 7/023; B81B 7/02; C12M 23/16; C12M 41/46; C12M 47/02; G01N 27/447; G01N 27/44756; G01N 27/44791; G01N 33/5023; G01N 33/543; G01N 33/54326; G01N 35/10
See application file for complete search history.

MULTIPLEXER FOR CONTROLLING FLUID IN MICROFLUIDICS CHIP AND MICROFLUIDICS CHIP ASSEMBLY

CROSS-REFERENCE TO RELATED APPLICATION

This application claims the benefit of Korean Patent Application No. 10-2016-0045560, filed on Apr. 14, 2016 in the Korean Intellectual Property Office, the disclosure of which is incorporated herein by reference.

BACKGROUND OF THE INVENTION

1. Field of the Invention

The present invention relates to a multiplexer capable of controlling a fluid in a microchannel of a microfluidics chip and a microfluidics chip assembly including the same.

2. Description of the Related Art

A microfluidics chip may be called Lab-on-a-chip (LOC) and can analyze a profile in which while a small quality of materials to be analyzed flow, the materials react with various biomolecules or sensors aggregated in a chip. In recent years, application fields of the microfluidics chip have been widened primarily to separation, synthesis, quantitative analysis, and the like of an analyzed material.

Meanwhile, as a method for controlling a flow of fluids in the microchannel of the microfluidics chip, a pneumatic valve using a transformable member is generally used and in detail, the flow of the fluids in the microchannel positioned below the membrane can be selectively interrupted blocked through expansion of the membrane. As one example, Korean Patent Unexamined Publication No. 2012-0056055 discloses a micro valve controlling the quantity of sample channels by expanding a thin polymer membrane.

However, when the thin polymer membrane is used as the pneumatic valve, a life-span of the pneumatic valve itself is limitative and the pneumatic valve has a limit in use due to direct contact with fluids in a channel, and the like.

Further, as the pneumatic valve selectively interrupting the channel, that is, the membrane needs to the channel one to one and a solenoid valve generating a pneumatic pressure needs to be connected to each channel, and the like, a manufacturing method or manufacturing cost of the micro valve is significant and controlling the flow of the fluids is significantly complicated because the channel needs to be controlled one to one.

SUMMARY OF THE INVENTION

The present invention provides a multiplexer and a microfluidics chip assembly including the same, which can exclude a separate membrane selectively interrupting a microchannel of a microfluidics chip and control a flow of fluids in the microchannel to solve various problems in use and manufacturing, such as a limit in life-span or a process of forming a membrane.

The present invention selectively interrupts the flow of the fluids in the microfluidics chip only by a pneumatic pressure.

The present invention provides a multiplexer and a microfluidics chip assembly including the same, which can respective microchannels only with less solenoid valves than the microchannels without arranging a pneumatic valve and a solenoid valve for controlling the microchannels provided in the microfluidics chip one to one to implement simplification of a manufacturing process and saving of manufacturing cost through the simplification of the manufacturing process.

An exemplary embodiment of the present invention provides a multiplexer for controlling a fluid in a microchannel by controlling pneumatic pressure in the microchannel in a microfluidics chip, including: a first pneumatic channel; and a second pneumatic channel forming a cross point which is in communication with the first pneumatic channel, wherein the cross point is in communication with the microchannel of the microfluidics chip, and predetermined pneumatic pressure is provided to the microchannel by using a combination of pneumatic pressing, channel closing, or channel opening to the first and second pneumatic channels. Namely, the user can control the pneumatic pressure provided to the first and second pneumatic channels by selecting one from a group of pneumatic pressure providing, channel closing and channel opening, and the predetermined pneumatic pressure provided to the microchannel can be controlled by using the above combination.

Another exemplary embodiment of the present invention provides a multiplexer for controlling a fluid in a microchannel by providing pneumatic pressure into a microchannel of a microfluidics chip, including: a first lamination plate having a first pneumatic channel; and a second lamination plate having a second pneumatic channel and a cross point where the second pneumatic channel crosses the first pneumatic channel to form the cross point to be in communication with each other, wherein while the microfluidics chip vertically overlaps with the first and second lamination plates, the microchannel is in communication with the cross point, and as a result, when the pneumatic pressure is provided to any one side of first and second pneumatic channels, loss of the pneumatic pressure to the other side occurs and only when the pneumatic pressure is provided to both the first and second pneumatic channels or the pneumatic pressure is provided to any one side of the first and second pneumatic channels and the other side is closed, the pneumatic pressure may be provided to the microchannel. When the pneumatic pressure is provided to the microchannel, a concentration gradient for a reagent in the microchannel may be implemented or reaction of a reaction object depending on a type or a concentration of the reagent may be verified.

Selective interruption of the microchannel is implemented by using not a separate thin film but only the pneumatic pressure, and as a result, a complicated process for generating a membrane is omitted, thereby reducing manufacturing cost.

Further, when air pressure is provided to any one side of the first and second pneumatic channels, pressure leaks to the other side and the pneumatic pressure is provided to both the first and second pneumatic channels to control the fluid in the microchannel of the microfluidics chip, and as a result, an external device (e.g., a solenoid valve) for providing the pressure need not be disposed to correspond to the microchannel one to one and the manufacturing cost can be reduced and the number of complicated external devices can be minimized, thereby enabling a high-density screening test.

In detail, a multiplexer may be provided, in which two or more of M first pneumatic channels and N second pneumatic channels separated from each other are provided and each second pneumatic channel includes branch channels branched to correspond to the number M of first pneumatic channels and when the branch channel forms a cross point with the first pneumatic channel, at least M*N microchannels may be controlled by using M+N first and second pneumatic channels. For example, when each second pneumatic channel includes the branch channels of the same number as the first pneumatic channels, the pneumatic pressure may be provided independently to M*N microchannels by using M+N first and second pneumatic channels.

The multiplexer may be simply manufactured by sequentially laminating the first lamination plate and the second lamination plate on the top of the microfluidics chip having the microchannel in the related art.

As a detailed example for connecting the microchannels and the pneumatic channels formed on the laminated chip or plate, the first pneumatic channel, the second pneumatic channel, and the microchannel may be provided to the first lamination plate, the second lamination plate, and the microfluidics chip, respectively in a groove shape and the second pneumatic channel may be partially provided in a hole shape at the cross point to be in communication with the first pneumatic channel and the microchannel may also be in communication at the cross point. Differently, the second pneumatic channel may vertically penetrate the second lamination plate and the first pneumatic channel and the microchannel may be provided on the bottom of the first lamination plate and the top of the microfluidics chip, respectively in the groove shape toward the second pneumatic channel.

Further, appropriate through-holes may be formed on the first and second lamination plates in order to provide air pressure to the first pneumatic channel of the first lamination plate and the second pneumatic channel of the second lamination plate disposed between the second lamination plate and the microfluidics chip. For example, a first through-hole for providing the pneumatic pressure to the first pneumatic channel and a second through-hole for providing the pneumatic pressure to the second pneumatic channel of the second lamination plate may be formed in the first laminate plate.

In the case of the first and second lamination plates of the multiplexer, a pattern for forming the pneumatic channel or the through-hole may be carved and a synthetic resin such as polydimethylsiloxane (PDMS) may be provided through a photography or spin coating method.

The above described multiplexer is laid on the microfluidics chip to control the fluid in the microchannel by using only the pneumatic pressure without a separate membrane.

In a microfluidics chip in the related art, a separate thin member is used for selective interruption of a microchannel, and as a result, a complicated membrane generation process is added and the membrane is limited in life-span in a thin synthetic resin form and the membrane may directly contact a drug in the microchannel in actual use. However, in the case of a multiplexer and a microfluidics chip assembly adopting the same, since only pneumatic pressure may can serve as a valve that controls a fluid in the microchannel without using the membrane, and as a result, a complicated process is omitted, thereby reducing manufacturing cost.

Further, in the case of the multiplexer and the microfluidics chip assembly adopting the same, only when the pneumatic pressure is applied to both first and second pneumatic channels connected with the microchannels or the pneumatic pressure is provided to any one of the first and second pneumatic channels and the other side is closed, the pneumatic pressure can serve as an opened valve and when air pressure is provided to any one side of the first and second pneumatic channels, the air pressure serves as a closed valve to cause the pressure to leak to the other side, and as a result, a solenoid valve need not be disposed in the microchannel one to one, therefore, the manufacturing cost can be reduced and the number of complicated external devices can be minimized, thereby enabling a high-density sorting inspection.

DETAILED DESCRIPTION OF THE PREFERRED EMBODIMENTS

Figure 1:
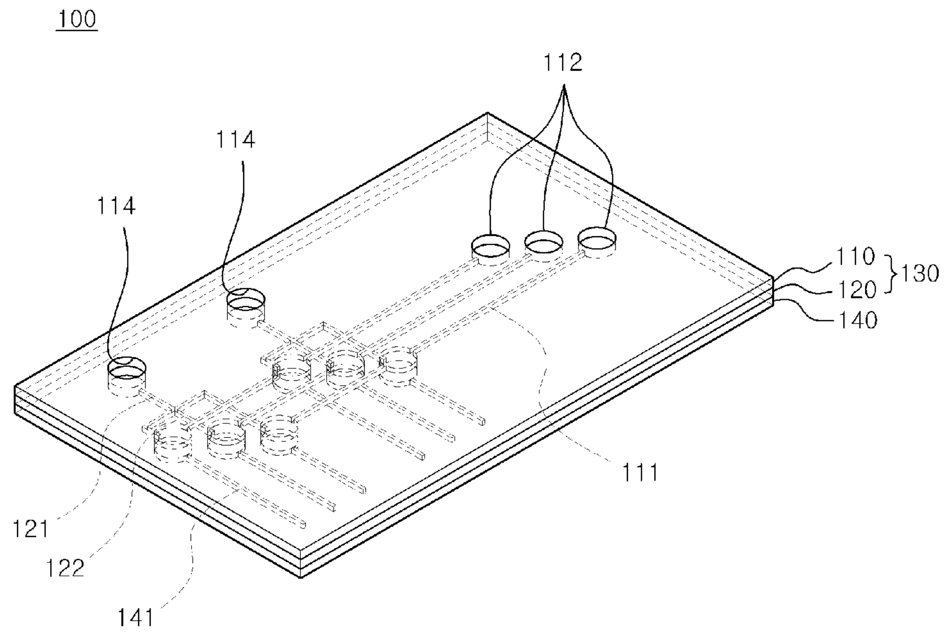
FIG. 1 is a perspective view of a microfluidics chip assembly according to an exemplary embodiment of the present invention.

Hereinafter, exemplary embodiments of the present invention will be described in detail with reference to the accompanying drawings, but the present invention is not limited or restricted to the exemplary embodiments. For reference, in the description, like reference numerals substantially refer to like elements, which may be described by citing contents disclosed in other drawings under such a rule and contents determined to be apparent to those skilled in the art or repeated may be omitted.

Figure 2:
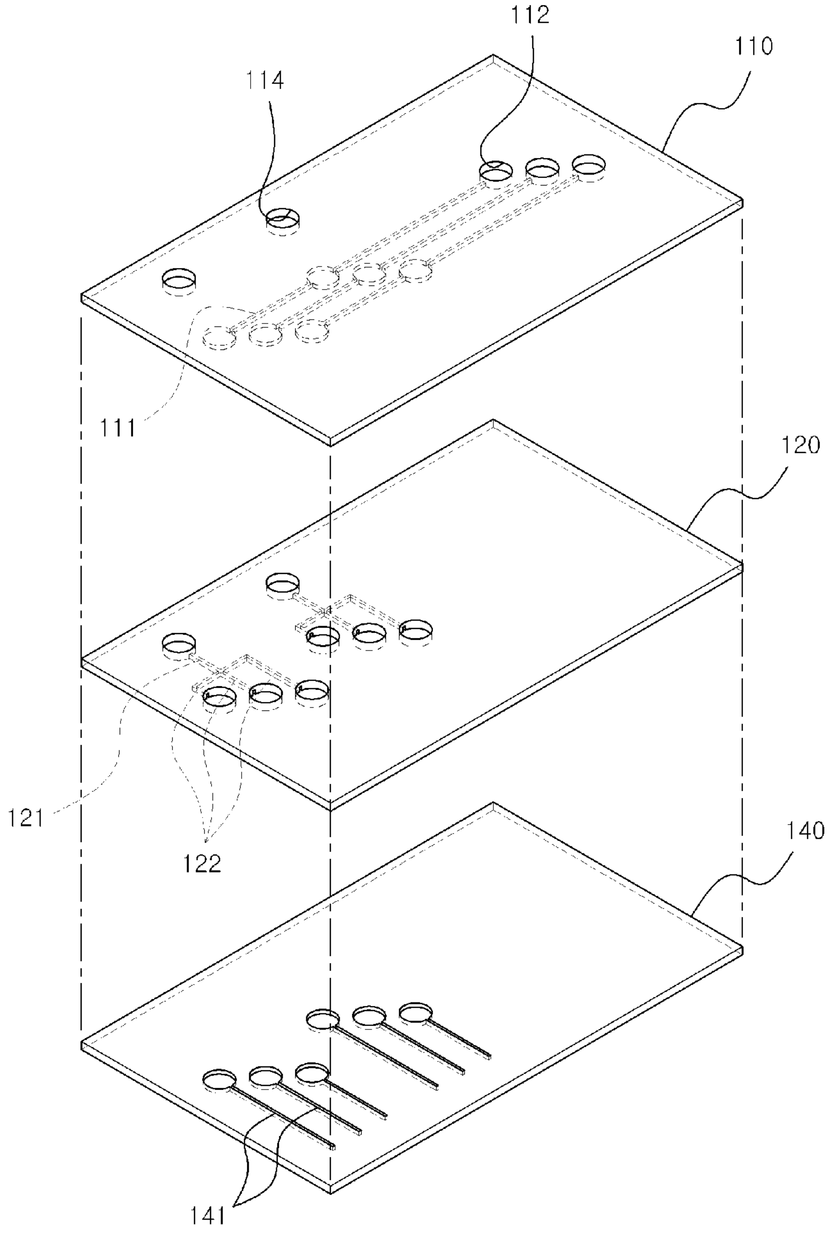
FIG. 2 is an exploded perspective view of the microfluidics chip assembly.

FIG. 1 is a perspective view of a microfluidics chip assembly according to an exemplary embodiment of the present invention. FIG. 2 is an exploded perspective view of the microfluidics chip assembly and FIG. 3 is a schematic structural diagram of a pneumatic channel and a microchannel for describing that air is selectively injected into the microchannel of a microfluidics chip by using a multiplexer.

Figure 3:
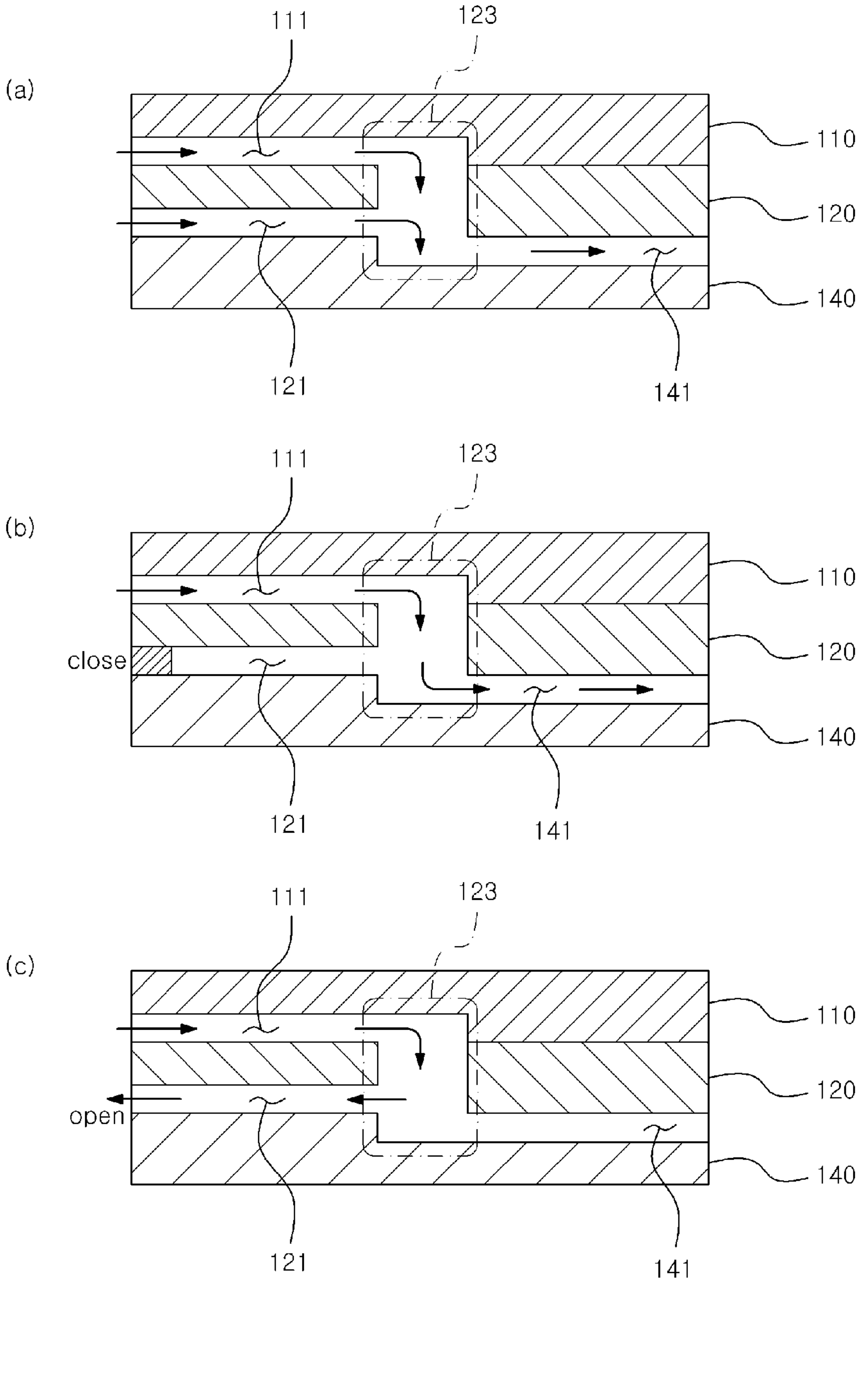
FIG. 3 is a schematic structural diagram of a pneumatic channel and a microchannel for describing that air is selectively injected into the microchannel of a microfluidics chip by using a multiplexer.

Referring to FIGS. 1 to 3, the microfluidics chip assembly 100 according to the exemplary embodiment includes a multiplexer 130 and a microfluidics chip 140.

The multiplexer 130 is formed by laminating two lamination plates and microchannels 141 are formed in the microfluidics chip 140 provided in a plate type like the lamination plate.

The plates are preferably made of glass or silicones and synthetic materials which less react with acid or base or other biochemical materials. In particular, polymethylsiloxane may be used and the materials as polymer materials which may be bonded to each other may implement a stable tight contact state between the plates and although described later in detail, plates having the pneumatic channels or the microchannels provided a shape of a groove dug on the surface of the plate with a predetermined depth, such as a groove or a hole penetrating the plate tightly contact each other to effectively maintain a sealing state of the channels.

First, the multiplexer 130 has a first lamination plate 110 and a second lamination plate 120 and a first pneumatic channel 111 is formed on the first lamination plate 110. The first pneumatic channel 111 is provided in the groove shape formed on the surface of the first lamination plate 110. In addition, a second pneumatic channel 121 is formed on the second lamination plate 120 and the second pneumatic channel 121 may also be provided in the groove shape formed on the surface of the second lamination plate 120.

However, the first and second pneumatic channel 111 and 121 need to be in communication with each other at a cross point 123 and a part of the second pneumatic channel 121 may be thus provided in the hole shape vertically penetrating the second lamination plate 120 at the cross point 123.

The first and second lamination plates 110 and 120 of the multiplexer 130 are laid on the microfluidics chip 140 and during this process, the microchannels 141 formed in the microfluidics chip 140 may be in communication with the cross point 124 formed by the first and second pneumatic channel 111 and 121.

As seen in FIGS. 1 to 3, in the case of a lamination order, the first lamination plate 1110, the second lamination plate 120, and the microfluidics chip 140 are sequentially laminated from the top to the bottom and a second through-hole 114 for providing a pneumatic pressure to the second pneumatic channel 121 of the second lamination plate 120 disposed below the first lamination plate 110 penetrates the first lamination plate 110 and similarly, a first through-hole 112 for providing the pneumatic pressure to the first pneumatic channel 111 is formed.

Through the multiplexer 130, the pneumatic pressure may be provided to the microchannels 141 of the microfluidics chip 140 disposed to tightly contact the bottom of the multiplexer 130. The pneumatic pressure is provided to the microchannels 141 of the microfluidics chip 140 to serve as a pneumatic valve and perform even basic function to analyze a profile in which a small quantity of materials to be analyzed flows to the microchannels to reach with various biomolecules or sensors aggregated in the chip.

In particular, the first pneumatic channel 111 and the second pneumatic channel 121 of the multiplexer 130 of the present invention are in communication with each other at the cross point 123 and due to such a reason, when the pneumatic pressure is provided to any one side, the pneumatic pressure leaks to the other side. This is illustrated in detail in FIG. 3 and in detail, the case is illustrated in FIG. 3C. Of course, a predetermined amount of pneumatic pressure may flow in the microchannels 141, but this may be appreciated that a reagent or a specimen in the microchannels 141 or only very little pneumatic pressure not to serve as the pneumatic valve is transferred.

That is, it is easy to transfer pneumatic pressure at a designed level to the microchannels 141 only when the pneumatic pressure is provided to both the first and second pneumatic channels 111 and 121 as illustrated in FIG. 3A. For reference, in FIG. 3B, illustrated is a case where the pneumatic pressure is provided to only any one side of the first and second pneumatic channels 111 and 121, but the other side is closed, and as a result, the pneumatic pressure is provided to the microchannels 141.

Meanwhile, air provided to the pneumatic channels is controlled through the solenoid valve and the air is provided to the pneumatic channels or the aforementioned closing state is implemented by operating an on/off state of the solenoid valve. For reference, the air is preferably nitrogen which is inert gas, but a type of the air is appropriately selected by the reagent or specimen and is not limited to the nitrogen and the valve may also be replaced with another device which may selectively provide/interrupt external gas to the pneumatic channels and is not limited only to the aforementioned solenoid valve.

Meanwhile, in the related art, the solenoid valves need to be disposed in all microchannels one to one in order to provide the pneumatic pressure to the microchannels, and as a result, it is difficult to miniaturize a facility and a high-density screening test itself is difficult.

However, the solenoid valves need not be disposed in the microchannels one to one by using the multiplexer 130 according to the present invention and manufacturing cost may be reduced and the miniaturization of the facility may be implemented.

Referring to FIGS. 1 or 2, the multiplexer 130 has the first lamination plate 110 having three first pneumatic channels 111 and the second lamination plate 120 having two second pneumatic channels 121.

Further, the second pneumatic channels 121 is branched into a plurality of branch channels 122 and the number of branch channels 122 is provided to correspond to the number of first pneumatic channels 111. Herein, the "correspond" means that when the number of branch channels 122 is larger than the number of first pneumatic channels 111, branch channels not connected to the first pneumatic channels are present, and as a result, the number of branch channels included in one second pneumatic channel may be provided to be equal to or less than the total number of first pneumatic channels.

In the exemplary embodiment, the number of branch channels 122 included in each second pneumatic channel 121 is three similarly to the number of first pneumatic channels 111. Accordingly, only 5 solenoid valves which is the sum total of 3 which is the number of first pneumatic channels 111 and 2 which is the number of second pneumatic channels 121 are connected to the first and second through-holes 112 and 114 to selectively provide the pneumatic pressure and may control each of 6 branch channels 122 which is a multiplication of the number of first pneumatic channels 111 and the number of second pneumatic channels 121 and individually control the microchannels 141 connected to the branch channels 122.

Figure 4:
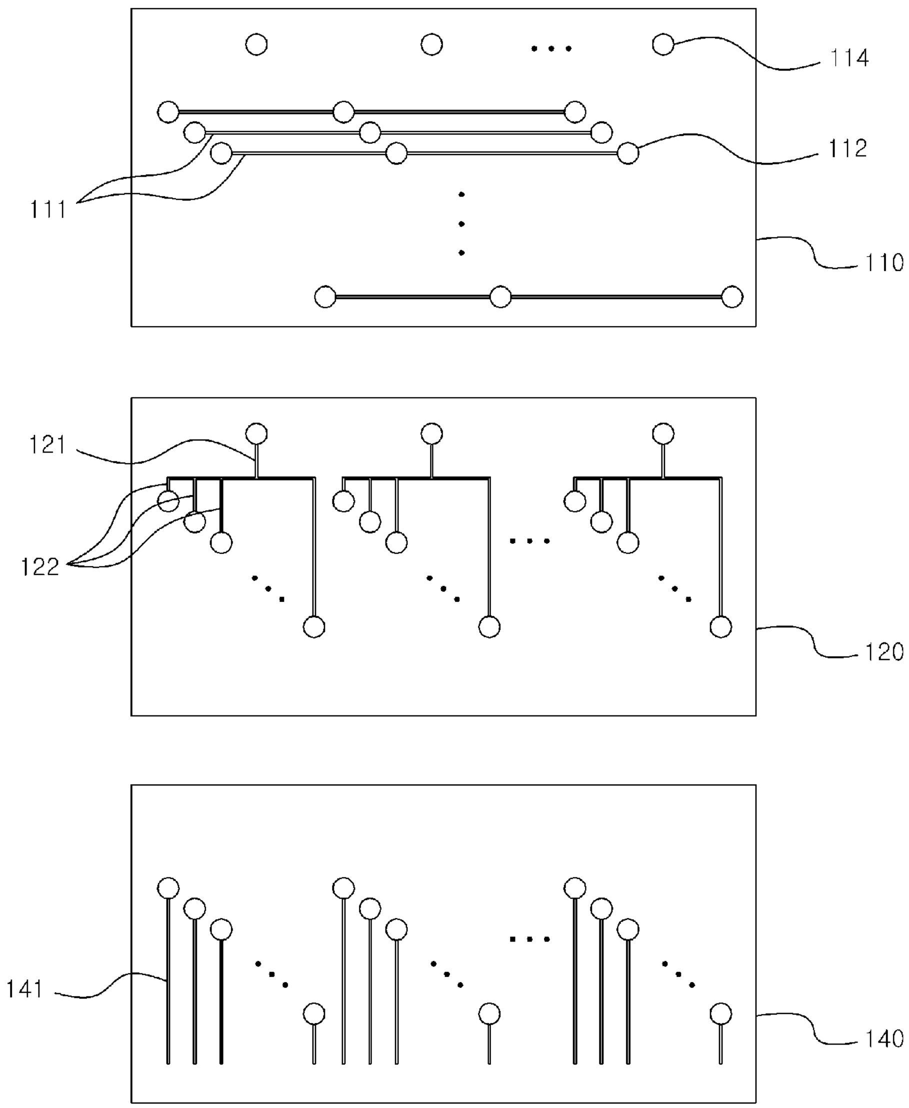
FIG. 4 illustrates a microfluidics chip assembly capable of controlling (M*N) microchannels by using (M+N) pneumatic channels according to the present invention.

When the exemplary embodiment is generalized, as illustrated in FIG. 4, two or more of M first pneumatic channels 111 and N second pneumatic channels 121 separated from each other are provided and each second pneumatic channel 121 includes branch channels 122 branched to correspond to the number M of first pneumatic channels 111 and the branch channel 122 forms the cross point with the first pneumatic channel 111. In this case, the multiplexer 130 may be provided, which may control at least M*N microchannels 141 by using M+N first and second pneumatic channels 111 and 121. In detail, when it is assumed that each second pneumatic channel 121 includes branch channels 122 of the same number as the first pneumatic channels 111, the pneumatic pressure may be provided independently to the respective M*N microchannels 141 by using M+N first and second pneumatic channels 111 and 121.

The present invention has been described with reference to the preferred embodiments of the present application. However, it will be appreciated by those skilled in the art that various modifications and changes of the present invention can be made without departing from the spirit and the scope of the present invention which are defined in the appended claims and their equivalents.

What is claimed is:

1. A multiplexer for controlling a fluid in a microchannel by controlling pneumatic pressure in the microchannel in a microfluidics chip, the multiplexer comprising:

a first pneumatic channel; and a second pneumatic channel forming a cross point which is in communication with the first pneumatic channel, wherein the cross point is in communication with the microchannel of the microfluidics chip, and wherein a predetermined pneumatic pressure is configured to be provided to the microchannel by a combination of pneumatic pressing, channel closing, or channel opening to the first and second pneumatic channels.

2. The multiplexer of claim 1, wherein the pneumatic pressure is provided to the microchannel, when the pneumatic pressure is provided to both the first and second pneumatic channels or when the pneumatic pressure is provided to any one side of the first and second pneumatic channels and the other side is closed.

3. The multiplexer of claim 1, wherein two or more of M first pneuamtic channels separated from each other are provided, two or more of N second pneumatic channels separated from each other are provided, each of the second pneumatic channels including branch channels branched to correspond to the number M of first pneumatic channels, and the branch channel forms the cross point by crossing the first pneumatic channel.

4. The multiplexer of claim 3, wherein the pneumatic pressure may be controlled to be provided independently to M*N microchannels by using M+N first and second pneumatic channels.

5. The multiplexer of claim 1, further comprising:

a first lamination plate having the first pneumatic channel and a second lamination plate having the second pneumatic channel, wherein while the second lamination plate overlaps with the first lamination plate, the second pneumatic channel crosses the first pneumatic channel to form the cross point to be in communication with each other, and while the microfluidics chip vertically overlaps with the first and second lamination plates, the microchannel is in communication with the cross point.

6. The multiplexer of claim 5, wherein the first lamination plate, the second lamination plate, and the microfluidics chip are sequentially laminated from the top to the bottom, and the first pneumatic channel, the second pneumatic channel, and the microchannel are provided to the first lamination plate, the second lamination plate, and the microfluidics chip, respectively in a groove shape and the second pneumatic channel being provided in a hole shape at the cross point.

7. The multiplexer of claim 6, wherein a first through-hole for providing the pneumatic pressure to the first pneumatic channel and a second through-hole for providing the pneumatic pressure to the second pneumatic channel of the second lamination plate are formed in the first laminate plate.

8. A microfluidics chip assembly for controlling a fluid in a microchannel with pneumatic pressure, the microfluidics chip assembly comprising:

a first lamination plate having a first pneumatic channel; and a second lamination plate having a second pneumatic channel and a cross point where the second pneumatic channel crosses the first pneumatic channel to form the cross point to be in communication with each other; and a microfluidics chip including a microchannel which is in communication with the cross point while vertically overlapping with the first and second lamination plates, wherein a predetermined pneumatic pressure is configured to be provided to the microchannel by a combination of pneumatic pressing, channel closing, or channel opening to the first and second pneumatic channels.

9. The microfluidics chip assembly of claim 8, wherein two or more of M first pneumatic channels separated from each other are provided, two or more of N second pneumatic channels separated from each other are provided, each of the second pneumatic channels including branch channels branched to correspond to the number M of first pneumatic channels, and the branch channel forms the cross point by crossing the first pneumatic channel and the microchannel is in communication with the cross point.

10. The microfluidics chip assembly of claim 8, wherein the first lamination plate, the second lamination plate, and the microfluidics chip are sequentially laminated from the top to the bottom, and the first pneumatic channel, the second pneumatic channel, and the microchannel are provided to the first lamination plate, the second lamination plate, and the microfluidics chip, respectively in a groove shape and the second pneumatic channel is provided in a hole shape at the cross point.

* * * * *